United States Patent
Feldmann

[19]

[11] Patent Number: 6,158,468
[45] Date of Patent: Dec. 12, 2000

[54] VALVE ARRANGEMENT FOR OPERATOR ACTUATED DELIVERY OF A PRESSURE MEDIUM

[75] Inventor: Joachim Feldmann, Neustadt, Germany

[73] Assignee: WABCO GmbH, Hannover, Germany

[21] Appl. No.: 09/249,525

[22] Filed: Feb. 12, 1999

[30] Foreign Application Priority Data

Feb. 19, 1998 [DE] Germany ............................ 198 06 936

[51] Int. Cl.⁷ ................................................. F16K 21/00
[52] U.S. Cl. ........................................................ 137/627.5
[58] Field of Search ......................................... 137/627.5

[56] References Cited

U.S. PATENT DOCUMENTS

| | | | |
|---|---|---|---|
| 3,132,567 | 5/1964 | Ingres et al. | 137/627.5 |
| 4,134,418 | 1/1979 | Woodcock | 137/116.5 |
| 4,818,036 | 4/1989 | Reinecke . | |
| 4,926,907 | 5/1990 | Fauck et al. | 137/627.5 |
| 5,897,174 | 4/1999 | Ehrlich | 303/40 |

FOREIGN PATENT DOCUMENTS

| | | |
|---|---|---|
| 2328735 | 1/1975 | Germany . |
| 2741696 | 3/1979 | Germany . |
| 19610834 | 6/1997 | Germany . |

OTHER PUBLICATIONS

Wabco Westinghouse publication entitled "Motorwagen—Bremoventil Blatt," No. 461, 106, pp. 1–3 (Aug. 1973).
Wabco Westinghouse publication entitled "Motorwagen-–Bremoventil," No. 461, 295, pp. 1–2 (Aug. 1973).

*Primary Examiner*—Gregory L. Huson
*Assistant Examiner*—Ramesh Krishnamurthy
*Attorney, Agent, or Firm*—Proskauer Rose LLP

[57] ABSTRACT

A valve arrangement includes a pressure medium inlet chamber, a pressure medium outlet chamber connected to a consumer, for example, a brake cylinder, and a pressure medium exhaust leading to a pressure medium sink. The pressure medium inlet chamber is connected to a pressure medium source. The pressure medium outlet chamber can be connected by operation of a controllable inlet valve to the pressure medium inlet chamber and by a controllable exhaust valve to a pressure medium sink. The actuating force requirement is small because the pressure force on the active surface of the graduating piston is absorbed by the regulating spring. As a result, the actuating force requirement of such arrangement is very low by comparison with the actuating force requirement of heretofore known arrangements. This feature permits facilitated selection of an actuating force requirement by placement of a spring which acts in opposition to an operating element of the arrangement. The invention finds particular significance in applications directed to vehicle braking systems.

10 Claims, 2 Drawing Sheets

VALVE ARRANGEMENT FOR OPERATOR ACTUATED DELIVERY OF A PRESSURE MEDIUM

BACKGROUND OF THE INVENTION

The present invention relates to a valve arrangement for use with a valve system regulating delivery of a pressure medium, and more particularly, an arrangement for controlling operator-actuated delivery of a compressed medium to one or more consumers.

A known pressure medium regulating valve arrangement, in which a pedal serves as an operating element, is disclosed, for example, in the WABCO Westinghouse publication "Motorwagen-Bremsventil (motor car brake valve) 461 106 Page 1," August 1973 edition. In the arrangement described therein, a regulating spring in the form of an elastomer spring is located between a graduating piston and a ram. An outlet valve seat in this valve system is installed on the graduating piston and an inlet valve seat on the housing of the valve system. As a result, the pressure supplied by the valve system produces a force, hereinafter referred to as the "pressure force", which is exerted via the ram upon the operating element when the arrangement is actuated. In order to maintain actuation of the system, the operator must exert an actuating force in opposition to the pressure force (and negligible spring return forces), the magnitude of which depends on lever ratios between the operating element and the valve system, in addition to the pressure force. This means that for a given lever ratio, the actuating force is a function of the delivered pressure. The evolution of the actuating force as a function of the delivered pressure is referred to herein as the "actuating force requirement."

Often, an application requires a change in the above mentioned lever ratios, for example due to a change of the length of the operating element, while nevertheless requiring that a value of the actuation force requirement be maintained. Conversely, there are applications requiring a change in the actuation force requirement while the lever ratios remain unchanged. Such applications occur, in particular, when the installed actuating element is separated from the valve system, as is provided, for example, in the WABCO Westinghouse publication "Motorwagen-Bremsventil (Motor Car Brake Valve) 461 295," August 1973 edition. A comparable system is also disclosed in FIG. 4 on page 6 of the Clayton Dewandre Air Pressure Equipment Brochure "E, E-1, E-2, & DUAL E BRAKE VALVES." In such cases it, is not possible to properly adapt the system without changing the diameter of the graduating piston, and therefore not without requiring associated additional changes in the valve system. These changes, which require a redesign of the valve system, result in high development costs. Furthermore, the increased number of versions necessitated by such changes contribute to increased manufacturing, material and storage costs, among others drawbacks.

It is therefore the object of the present invention to develop an arrangement of the type mentioned above which permits the actuation force requirement thereof to be adapted to various applications with little or no changes in the valve system.

SUMMARY OF THE INVENTION

Briefly stated, a valve arrangement is provided for delivery of pressure from a pressure supply and which includes a valve system actuated by actuating force applied to a movable operating element. The valve system of such arrangement includes a housing containing a supply chamber connected to the pressure supply, an operating chamber connected to at least one consumer, such as a brake cylinder, and a pressure relief outlet. A graduating piston which is subjected to a pressure in the operating chamber is provided. An inlet valve seat is carried on the graduating piston, which together with a sliding valve element forms an inlet valve, the inlet valve being operative to control communication between the supply chamber and the operating chamber. An outlet valve seat is carried on a ram, which together with the sliding valve element forms an outlet valve, the outlet valve being operative to control communication between the operating chamber and the pressure relief outlet. The ram is responsive to actuating movement of the operating element for controlling displacement of the sliding valve element, the ram being movable at least into a closing direction of the outlet valve and into an opening direction of the inlet valve. A regulating spring is held between the graduating piston and the housing for biasing the graduating piston against the pressure force.

Arrangements of the general type mentioned above are employed in all technical areas in which pressure-actuated controls are used, in particular, controls operated with pressurized gas. Where compressed air is the pressurized gas, the pressure relief output for the operated system generally exhausts to the atmosphere. When other gases are used, the pressure relief output is generally connected to a collection container under atmospheric pressure. Vehicle braking systems actuated by compressed air represent a significant area of application for embodiment of the invention.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
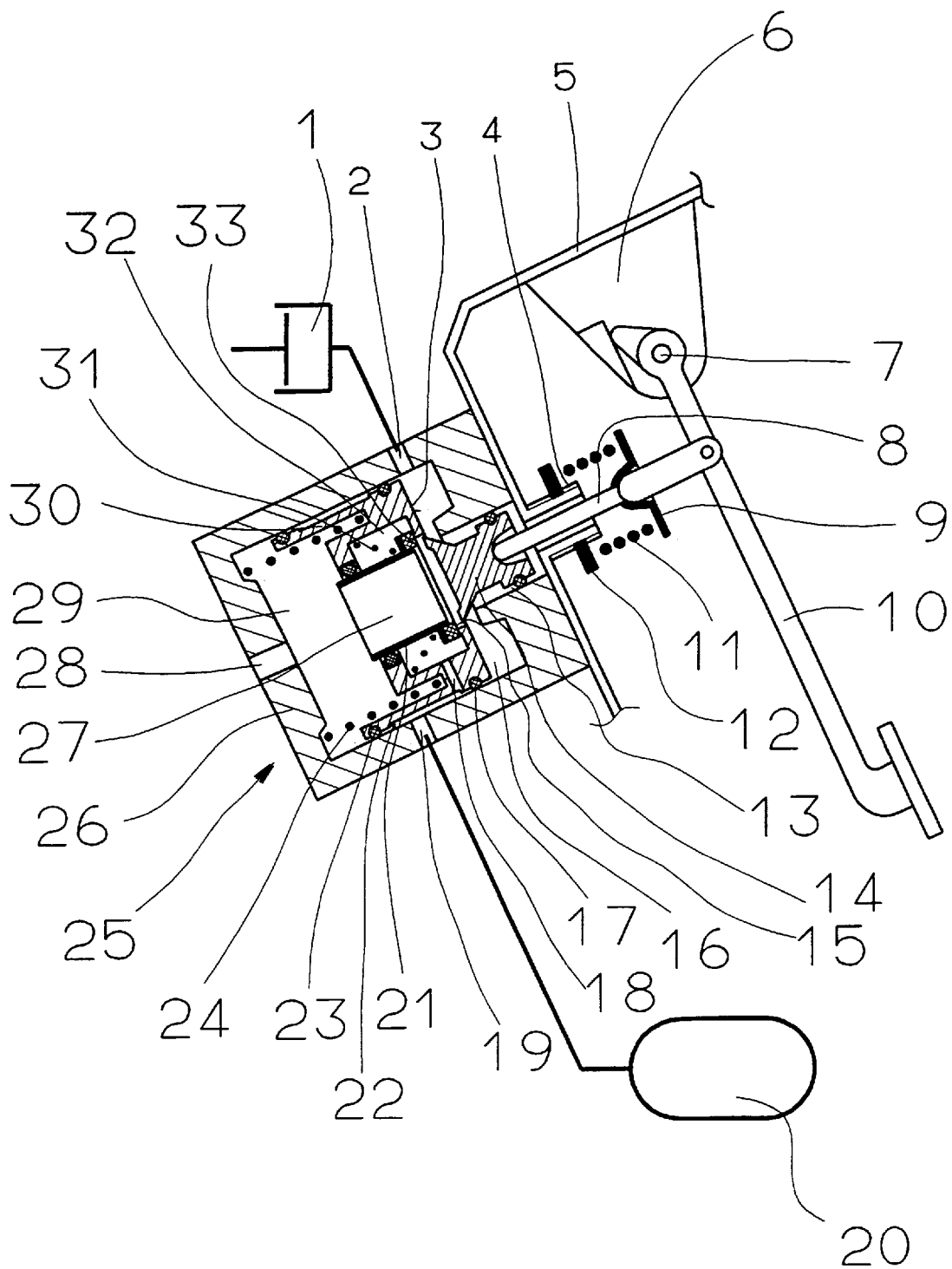
FIG. 1 is a schematic view of a valve arrangement in accordance with an embodiment of the invention.

Referring now to the figures, and in particular FIG. 1, a valve arrangement in accordance with an embodiment of the invention is shown, the valve arrangement including a valve system 25 and an operating element 10, each mounted in a suitable and conventional manner on a bearing element 5, 6. Although conveniently depicted in the form of a pedal, operating element 10 may alternatively be provided in various other suitable forms providing analogous function without departure from the invention. Valve system 25 is mounted in a fixed position, while operating element 10 is mounted for pivotable rotation about a bearing shaft 7. Alternative to use of bearing shaft 7, a bearing axle may be instead provided. Bearing element 5, 6 includes a bearing block 6 on which bearing shaft 7 is rotatably received. In a non-actuated state, operating element 10 is biased in a rest position against a stop carried on bearing block 6. In automotive applications, bearing element 5, 6 is generally comprised of a part of the floor of a driver's cab or a front wall thereof.

Valve system 25 is provided with a housing 26 which includes a supply port 19, a delivery port 2 and a pressure relief outlet 28. Supply port 19 is connected to a pressure supply 20, and delivery port 2 is connected to a consumer 1, such as for example, a brake cylinder. Consumer 1, depicted as one cylinder, may also represent several consumers. In the depicted embodiment, pressure relief outlet 28 exhausts to the atmosphere, an indication that the depicted embodiment of the example of FIG. 1 is thus designed for operation with compressed air as the pressure medium.

A longitudinally displaceable graduating piston 30 is movably received in housing 26. Graduating piston 30 is provided on its longitudinal extension with two sealing elements 17, 23 spaced apart a distance from each other and disposed circumferentially about graduating piston 30. Sealing elements 17, 23 are placed in such manner, and their distance from each other is selected such that the outlet of supply port 19 within housing 26 is inevitably located between sealing elements 17, 23 for any possible position of graduating piston 30 when actuated. As a result, a region bounded by sealing elements 17, 23, the outer circumferential wall of graduating piston 30 and the inner walls of housing 26 defines a first supply sub-chamber 22.

Graduating piston 30 is comprised of hollow structure, and includes a cavity, a portion of which constitutes a second supply sub-chamber 32 connected to first supply sub-chamber 22 via a passage 18. Although shown as a single passage, passage 18 may instead take the form of several passages. The two supply sub-chambers 22 and 32 together constitute a supply chamber 22, 32.

An operating chamber 16 within housing 26 is connected to delivery port 2, and separated from supply chamber 22, 32, in particular, first supply sub-chamber 22, by sealing element 17 of graduating piston 30 located closest to operating element 10. A face of graduating piston 30 directed towards operating chamber 16 is always subjected to the pressure in operating chamber 16 and is an active surface 3 of graduating piston 30. A passage formed in graduating piston 30 extends from active surface 3 to second supply sub-chamber 32. An inlet valve seat 33 is formed on graduating piston 30 around this passage, within second supply sub-chamber 32.

The other sealing element 23 of graduating piston 30 separates supply chamber 22, 32, in particular, the first supply sub-chamber (22), from a pressure relief chamber 29 connected to the pressure relief outlet 28.

Graduating piston 30 is biased by a regulating spring 24 in a direction opposite to the direction of the pressure acting upon active surface 3. In the depicted example, regulating spring 24 is located within the pressure relief chamber 29 between an area of the graduating piston 30 away from the active surface 3 and wall of housing 26 delimiting pressure relief chamber 29. It is noted, however, that regulating spring 24 may also be installed in any other suitable manner providing analogous function.

Graduating piston 30 is also provided with a further passage at an end thereof directed towards pressure relief chamber 29, and thereby also towards pressure relief outlet 28. A valve element 21, starting at inlet valve seat 33, extends the distance of second supply sub-chamber 32, located in the cavity of graduating piston 30 and the further passage. Valve element 21 is provided with a passage, designated as a pressure relief channel 27, having an opening on one side thereof within inlet valve seat 33 of graduating piston 30, and on a remaining side towards pressure relief chamber 29. Valve element 21 is slidable relative to graduating piston 30 and the passage formed therein in a sealed manner. Valve element 21 thereby separates pressure relief chamber 29 from second supply sub-chamber 32 and, hence, also from supply chamber 22, 32.

The ability of the valve element 21 to slide relative to graduating piston 30 in the direction of operating chamber 16 is limited by the impact of valve element 21 upon the surrounding inlet valve seat 33 formed on the graduating piston 30. Inlet valve seat 33, together with a surface or edge of valve element 21 having a form complementary thereto, constitute an inlet valve 21, 33 which controls the connection between supply chamber 22, 32, in particular, second supply sub-chamber 32, and operating chamber 16.

A closing spring 31 is held between valve element 21 and an inner wall of second supply sub-chamber 32, biasing valve element 21 in the direction of inlet valve seat 33, and thereby in the closing direction of inlet valve 21, 33. Closing spring 31 assists in the secure closing of inlet valve 21, 33, in particular, in the presence of low supply pressure.

A ram 14 extending from an end of housing 26 proximal to operating element 10 extends into operating chamber 16. Ram 14 is movably displaceable in a sealed manner in housing 26 towards valve element 21 and in a direction opposite thereto. An end of ram 14 directed towards graduating piston 30 is sized to allow it to penetrate the passage of graduating piston 30 surrounded by inlet valve seat 33 between active surface 3 and the second supply sub-chamber 32. A circumferential outlet valve seat 15 is provided at this end of ram 14. Outlet valve seat 15 is sized so that it delimits the outlet of pressure relief channel 27 extending through valve element 21 on the end thereof directed towards outlet valve seat 15. Outlet valve seat 15, together with a surface or edge of valve element 21 having a form complementary thereto, constitutes an outlet valve 15, 21 which controls the connection between operating chamber 16 and, pressure relief chamber 29 via pressure relief channel 27, and also therefore pressure relief outlet 28 and atmosphere.

A transmission element 8 is located between ram 14 and operating element 10, connected to each in a known manner permitting transmission element 8 to transmit a stroke caused by a rotation of operating element 10 in the direction of valve system 25 to the ram 14. A stroke in this direction is in the closing direction of outlet valve 15, 21, and at the same time the opening direction of inlet valve 21, 33. A connection for producing slidable action in an opposite direction is also possible.

In accordance with a further development of the basic embodiment described above, a spring 11 biases operating element 10 in the direction of its rest position, as will be discussed in further detail below.

FIG. 1 shows the arrangement in accordance with the invention in rest position. In this state, ram 14, graduating piston 30 and valve element 21 assume positions in which outlet valve seat 15 is lifted by an opening stroke of outlet valve 15,21 from valve element 21. As a result, outlet valve 15, 21 is open, and operating chamber 16, as well as consumer 1, is connected via pressure relief channel 27, pressure relief chamber 29 and pressure relief outlet 28 to the atmosphere.

To ensure that outlet valve 15, 21 is normally maintained securely in an open position, one or several recuperating springs can optionally be installed in a known manner on ram 14 and/or on operating element 10.

Actuation of the system is achieved by rotating operating element 10 in the direction of valve system 25. After covering a clearance distance which may exist between operating element 10 and the transmission element 8 and/or ram 14, transmission element 8 transmits the stroke which corresponds to a further rotation of operating element 10 to ram 14. As a result of the imparted stroke, outlet valve seat 15 comes to rest on valve element 21 and thereby closes outlet valve 15, 21 once the opening stroke of outlet valve 15, 21 has been covered. As the stroke continues, ram 14 lifts valve element 21 from inlet valve seat 33 against the force of closing spring 31 and/or against a possible force exerted by the supply pressure upon valve element 21, thereby opening inlet valve 21, 33. A force exerted by the supply pressure on valve element 21 occurs when the surfaces surrounded by inlet valve seat 33 and by the seal of valve element 21 in the passage of graduating piston 30 are of different size. As a rule, such a force is intentionally avoided by appropriate sizing of these surfaces.

When inlet valve 21, 33 is open, compressed air is permitted to flow from supply chamber 22, 32 into operating chamber 16, and from operating chamber 16 through the delivery port 2 into consumer 1. The pressure which then builds up in operating chamber 16 and in consumer 1 also acts upon active surface 3 of graduating piston 30, exerting a force thereupon. As a result, graduating piston 30 moves into the pressure relief chamber 29, compressing regulating spring 24. If the compression of regulating spring 24, and thereby the distance covered by graduating piston 30, is as great as the previously applied stroke of valve element 21, the inlet valve seat 33 comes again into resting contact with valve element 21 and thereby again closes inlet valve 21, 33. In this position now reached, termed herein the "end position," outlet valve 15, 21, as well as inlet valve 21, 33 are closed, so that no flow from pressure supply 20 to consumer 1 may occur.

A reverse actuation of the arrangement is effected by a corresponding back stroke of ram 14. Outlet valve seat 15 is then lifted from valve element 21, and opens outlet valve 15, 21. Compressed air from operating chamber 16 and consumer 1 can now be exhausted through pressure relief channel 27, pressure relief chamber 29 and pressure relief outlet 28 to the atmosphere. Due to the resultant pressure drop in operating chamber 16, regulating spring 24 is released, urging graduating piston 30 back towards its initial position. If the back stroke of ram 14 were to consist of only a partial back stroke, the back shift of graduating piston 30 ends again in an end position when valve element 21 is again seated on outlet valve seat 15 to close outlet valve 15, 21. If the back stroke of ram 14 were to consist of a complete back stroke, outlet valve 15, 21 remains open even after graduating piston 30 has been pushed back into its initial starting position, so that a complete pressure relief of operating chamber 16 and of the consumer 1 takes place.

During the functions described above, the force of the pressure in operating chamber 16 exerted on active surface 3 of graduating piston 30 is always absorbed by regulating spring 24. In the end positions, the force exerted on active surface 3 and the force of regulating spring 24 are balanced. During the entire procedure, ram 14 need only overcome the force of closing spring 31 and/or possibly the force of the supply pressure on valve element 21.

A back stroke of ram 14 is triggered either by turning back or releasing operating element 10, depending on the design of the particular arrangement. Where operating element 10 is turned back, ram 14 can be retracted with a suitable design of the angular connections between ram 14, transmission element 8, and operating element 10, and/or can follow the return rotation under the influence of a return setting force. In case of release of operating element 10, the return setting force exerted upon the ram 14 can also cause the return rotation of the operating element 10 and/or assist a return spring of operating element 10. Such return setting force can be produced, for example, by a return spring acting upon ram 14 or by making the surfaces surrounded by seal 13 of ram 14 in housing 26 larger than the surface surrounded by outlet valve seat 15.

The actuating force which the operator must apply on operating element 10 during the described functions depends, in addition to one or more possibly present return springs, on the negligible forces of closing spring 31 and of the supply pressure exerted upon valve element 21 and on the possible return setting force exerted upon ram 14.

Whatever means are ultimately used to effect a return stroke or a return rotation of ram 14 and of operating element 10, the necessary actuating force applied to operating element 10 to overcome these influences is very low by comparison with the actuating force requirement of the heretofore known arrangement mentioned initially. Therefore, the arrangement according to the invention can be actuated practically without any actuating force, operating purely as a function of the actuating distance. For this reason the arrangement in accordance with any of various embodiments of the invention has few requirements with regard to its installation, and is therefore well suited for virtually all applications.

Notwithstanding the above advantages, an actuating force with a measurable value is often required, for example, when applying the arrangement to use in a vehicle braking system. In such applications, an actuating force requirement can be produced without changing valve system 25, by providing a spring which exerts a spring force on operating element 10 in a direction opposite to the direction of movement for the closing of outlet valve 15, 21 and the opening of inlet valve 21, 33. Spring 11, mentioned previously, is an example of such a spring.

Spring 11 is held between bearing element 5, 6 and operating element 10, retained on operating element 10 via a spring plate 9 which is urged by spring 11 against a shoulder of transmission element 8.

In the rest position of the depicted arrangement, i.e. the rest position of operating element 10, spring 11 urges the latter against the stop formed on bearing block 6, and thus also acts as a return spring. Spring 11 imposes a spring force which the operator experiences as an actuating force required to produce the rotation for the actuation of the arrangement.

Since the output force of a spring can easily be changed by known means, this further development offers a simple option for adaptation of particular actuating requirements for all applications.

A change in spring force can be effected by replacing an existing spring 11 with one having the desired output force. Another option is to install spring 11 such that it is adjustable. A variant of the embodiment providing such selective variability in spring tension is depicted in FIG. 1. Bearing element 5, 6 is provided with a threaded neck 4 disposed around the passage of transmission element 8. A spring seat 12 with internal threads is threadably received on threaded neck 4, and can be displaced lengthwise by rotation thereof. By virtue of lengthwise displacement of spring seat 12, the compressive tension of spring 11, and thereby its output force, can be adjusted.

Further options for readily permitting adaptation of the arrangement to different applications are provided by spring 11 through the selection or modification of its characteristic force/deflection line. By employing suitable designs, spring 11 may be given a linear or a non-linear characteristic force/deflection line, with corresponding evolution of the actuating force upon operating element 10. Often a progressive evolution of the actuating force is required. This can be achieved, for example, by means of a progressive characteristic force/deflection line of spring 11, or can be assisted by same, for example when regulating spring 24 already has a progressive characteristic line.

Spring 11, which is depicted as a helical-compression spring, can also be provided in a completely different form without departure from the contemplated scope of the invention. For example, it may be alternatively provided as an elastomer spring similar to the regulating springs in the WABCO Westinghouse publications already mentioned, and which are incorporated herein by reference.

Spring 11 can also be assisted or replaced by one or more springs having different placement, for example, next to transmission element 8 and/or operating element 10, or disposed in a tension spring arrangement.

Figure 2:
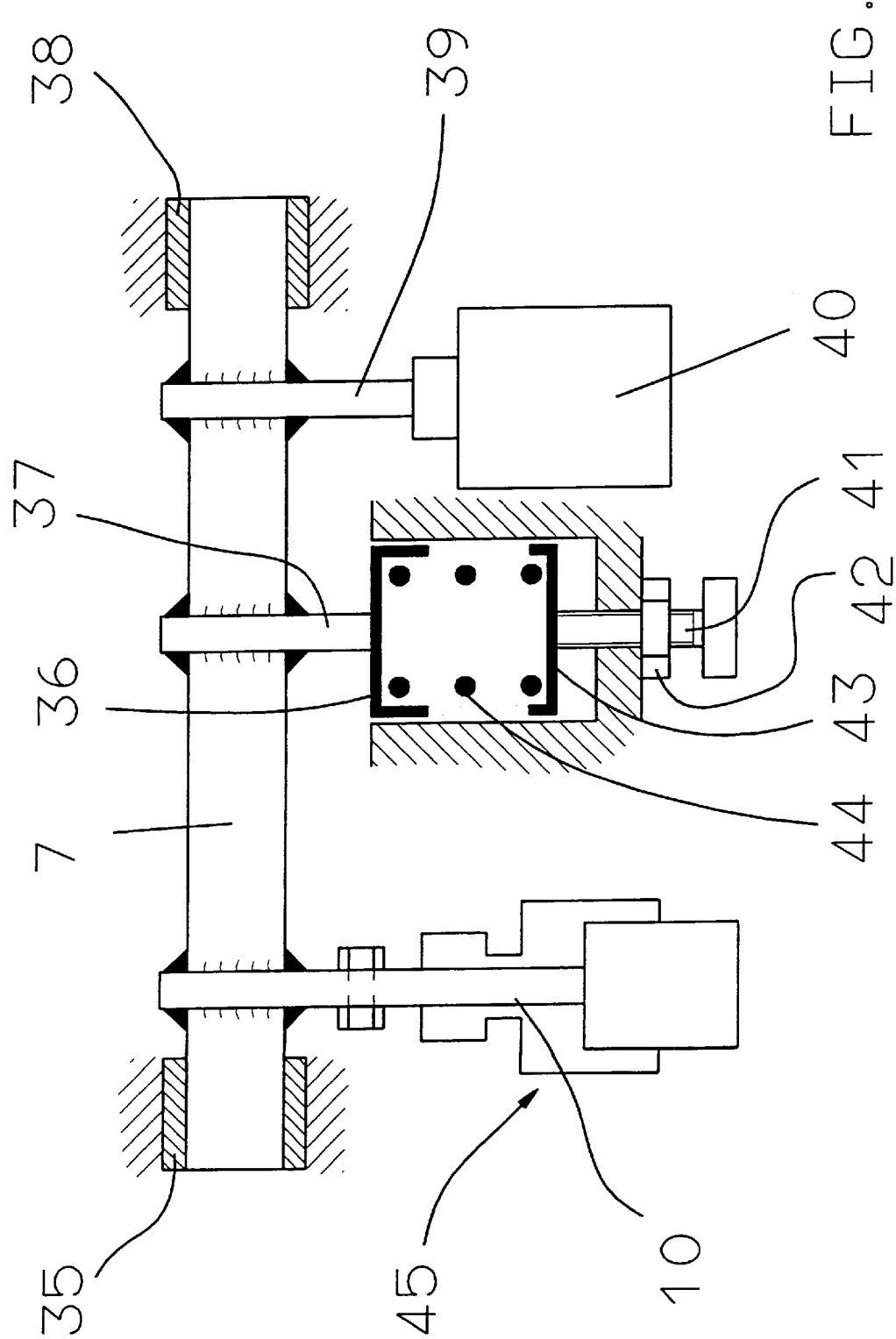
FIG. 2 is a schematic view of a valve arrangement in accordance with another embodiment of the invention.

Turning now to FIG. 2, another arrangement according to a further embodiment of the invention is shown, depicted from the perspective as viewed by the operator.

A valve system 45 is lever-operated in the depicted example, such as described in the WABCO Westinghouse publication "Motorwagen-Bremsventil 461 295," which was already mentioned earlier, and which is incorporated herein by reference.

In the arrangement in accordance with the embodiment of FIG. 2, operating element 10 is used for the simultaneous actuation of another device 40, which, in the depicted example is an electrical brake signal transmitter of an electrically controlled vehicle braking system. Such a brake signal transmitter is described, for example, in U.S. Pat. No. 4,818,036, entitled "BRAKING POWER TRANSMITTER," issued to Reinecke on Apr. 4, 1989, and which is incorporated herein by reference.

To actuate the other device 40, a cam 39 is installed on bearing shaft 7, fixedly connected thereto.

Depending on the particular application, the other device 40 may be different than that of the example shown without departure from the contemplated scope of the invention. Furthermore, several additional devices could also be provided, in which case bearing shaft 7 would be provided with corresponding cams for operation of same. Such arrangement, however, does not necessarily require that a special cam for every other device be provided on bearing shaft 7. Rather, it is possible for the devices to be placed at an angle to each other, and the cam, distributed over its circumference, provided with a special cam contour for each of these devices.

Reference numerals 35 and 38 designate rotary bearings of bearing shaft 7.

When so desired in a particular a system application, an actuating force can be provided conveniently, as shown, by a spring system. The spring system in the depicted example is located next to operating element 10, and contains one spring 44. Bearing shaft 7, which is fixedly connected to operating element 10, acts upon spring 44 by intercalation of a cup ram 36 moved via an additional cam 37. Spring 44 can be adjusted by means of a spring seat 43 and an adjustment screw 41, a desired setting of which is maintained by a lock nut 42.

The explanations applicable to one figure also apply generally to the remaining figure, directly or in corresponding application, to the extent that the above details are not in conflict with one another.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A valve arrangement for delivery of pressure from a pressure supply and including a valve system actuated by actuating force applied to a movable operating element, the valve system comprising:

a housing;

a supply chamber connected to the pressure supply;

an operating chamber connected to at least one consumer;

a pressure relief outlet;

a graduating piston which is subjected on a first side to a pressure in the operating chamber and on a second side to a force of a regulating spring;

a sliding valve element;

an inlet valve seat carried on the graduating piston, which together with the sliding valve element forms an inlet valve, the inlet valve being operative to control communication between the supply chamber and the operating chamber;

a ram responsive to actuating movement of the operating element for controlling displacement of the sliding valve element;

an outlet valve seat Red on the ram, which together with the sliding valve element forms an outlet valve, the outlet valve being operative to control communication between the operating chamber and the pressure relief outlet;

the ram being movable by the operating element at least into a closing direction of the outlet valve and into an opening direction of the inlet valve; and the regulating spring being held between the graduating piston and the housing, the regulating spring acting on the graduating piston against the pressure in the operating chamber.

2. A valve arrangement according to claim 1, wherein:

the graduating piston is hollow and includes structure defining a passage oriented in a direction towards the pressure relief outlet; and the valve element is movable in a sealed manner in the graduating piston and includes a passage having at an end thereof an opening within the inlet valve seat of the graduating piston and the outlet valve seat of the ram.

3. A valve arrangement according to claim 1, wherein at least a portion of the supply chamber is located in a cavity of the graduating piston.

4. A valve arrangement according to claim 1, wherein the operating element is used for simultaneous operation of at least one additional device.

5. A valve arrangement according to claim 4, wherein:

the valve system serves as a brake valve in a vehicle; and said additional device is an electrical brake signal transmitter.

6. A valve arrangement according to claim 1, further comprising:

at least one spring which exerts a spring force upon the operating element in a direction opposite to that direction associated with the closing of the outlet valve and the opening of the inlet valve.

7. A valve arrangement according to claim 6, wherein the spring presents a non-linear characteristic line for force/deflection.

8. A valve arrangement according to claim 7, wherein the slope of the characteristic line for force/deflection of the at least one spring increases with increasing displacement of the at least one spring.

9. A valve arrangement according to claim 6, wherein the spring force due to the at least one spring and the characteristic line for force/deflection of the at least one spring is adjustable.

10. A valve arrangement according to claim 1 wherein the ram is rigidly attached to the operating element.

* * * * *

UNITED STATES PATENT AND TRADEMARK OFFICE
CERTIFICATE OF CORRECTION

PATENT NO.   : 6,158,468
DATED        : December 12, 2000
INVENTOR(S)  : Joachim Feldmann Page 1 of 1

It is certified that error appears in the above-identified patent and that said Letters Patent is hereby corrected as shown below:

<u>Column 8,</u>
Line 28, "Red" should read: -- carried --.

Signed and Sealed this

Twenty-fifth Day of September, 2001

Attest:

NICHOLAS P. GODICI
Attesting Officer     Acting Director of the United States Patent and Trademark Office